(12) United States Patent
Upadhyay et al.

(10) Patent No.: US 8,011,002 B1
(45) Date of Patent: Aug. 30, 2011

(54) FORCING A MOBILE BROWSER TO ACCESS WEB CONTENT THROUGH A PROXY

(75) Inventors: Piyush Upadhyay, Overland Park, KS (US); Badri Prasad Subramanyan, Overland Park, KS (US); Ayodeji Abidogun, Overland Park, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 476 days.

(21) Appl. No.: 12/259,584

(22) Filed: Oct. 28, 2008

(51) Int. Cl.
*G06F 7/04* (2006.01)
*H04L 9/00* (2006.01)
*H04L 9/32* (2006.01)

(52) U.S. Cl. ............... 726/12; 726/27; 726/28; 726/29; 726/30; 726/13; 713/168; 713/169; 713/170; 713/171; 713/172

(58) Field of Classification Search ............... 726/12
See application file for complete search history.

(56) References Cited

U.S. PATENT DOCUMENTS 7,113,994 B1 * 9/2006 Swift et al. .......... 709/229
7,506,369 B2 * 3/2009 Buch et al. .......... 726/12

\* cited by examiner

*Primary Examiner* — Longbit Chai

(57) ABSTRACT

A method, system, and medium are provided for forcing a mobile device to request online content using a proxy server. In one embodiment, the mobile device sends a request to the content provider directly. The content provider may respond to the requesting browser with an instruction to request the content through a proxy server. The requesting mobile device may then send a second request for the content to the proxy server. The proxy server then sends a request to the content provider on behalf of the requesting mobile device.

17 Claims, 4 Drawing Sheets

FORCING A MOBILE BROWSER TO ACCESS WEB CONTENT THROUGH A PROXY

SUMMARY

The present invention is defined by the claims below. Embodiments of the present invention determine that a request for web content has not come from a designated proxy server. In response to the request, instructions are sent to the requesting device to re-request the web content through a designated proxy. The requesting device then sends a second request for the content to the designated proxy. The request is modified by the designated proxy to include authentication information and transmitted to the content provider. The content provider proceeds to set up a connection with the requesting device so that the requested content may be accessed.

In a first illustrative embodiment, one or more computer-storage media having computer-executable instructions embodied thereon for performing a method of instructing a mobile device to request access to content by submitting a new request to a proxy server is provided. The method includes receiving a first request from the mobile device for the content, determining that the first request was not submitted by an authorized proxy server, and transmitting a first response indicating the content should be accessed through the authorized proxy server. The method also includes receiving a second request from the authorized proxy server sent on behalf of the mobile device and transmitting a second response to the authorized proxy server granting access to the content.

In another illustrative embodiment, one or more computer-storage media having computer-executable instructions embodied thereon for performing a method authenticating access to web content using a proxy server is provided. The method includes receiving, at the proxy server, a first request for the web content from a mobile device connected to a mobile communications network associated with the proxy server. The first request includes a force indication that indicates that a requesting mobile device that generated the first request is forced to use the proxy server. The method also includes creating a second request by modifying the first request to include header information indicating the second request is from the proxy server, wherein the second request includes the force indication. The method further includes transmitting the second request to a content provider indicated in the second request.

In a third illustrative embodiment, one or more computer-storage media having computer-executable instructions embodied thereon for performing a method of requesting access to web content using a proxy server is provided. The method includes transmitting a first request for the web content to a provider of the web content without using the proxy server and receiving a first response from a content provider indicating the web content should be accessed through an authorized proxy server designated in the first response. The method also includes transmitting a second request to the authorized proxy server requesting access to the web content from the content provider. The second request includes a force indication that indicates that a requesting mobile device that generated the first request is forced to use the authorized proxy server to access the web content.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
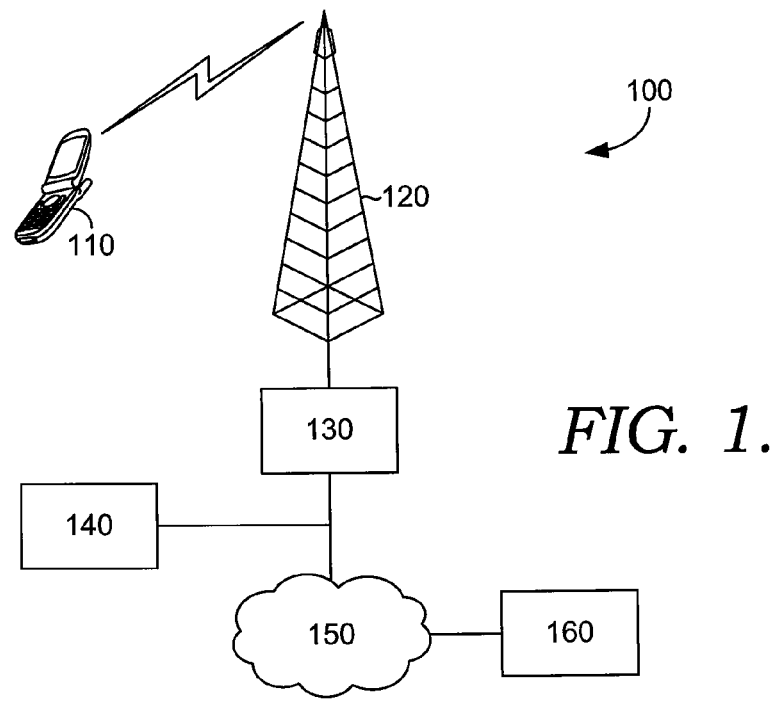
FIG. 1 is a drawing of an illustrative environment in which an embodiment of the present invention may operate.

Embodiments of the present invention provide systems and methods for providing access to online content. The content provider may rely, in whole or in part, on authentication information provided by a proxy server through which the request for content is sent to grant access to the online content. The authentication information may be as little as the request coming from the proxy server. For example, the content provider may have an agreement with an access provider to supply content to users of the access provider's network. In such a case, the content provider may only deem requests sent through web proxies associated with the access provider to be valid. In embodiments, the content provider sends a response to a requesting device, which sent a request through an invalid proxy (or no proxy at all), directing the requesting device to the proxy through which requests need to be sent. The requesting device may then resend the request through the appropriate proxy, if the requesting device has access to the appropriate proxy server.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CPU | Central Processing Unit |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| HLR | Home Location Register |
| IP | Internet Protocol |
| IETF | Internet Engineering Task Force |
| IMS | IP Multimedia Subsystem |
| LAN | Local Access Network |
| LCD | Liquid Crystal Display |
| MSC | Mobile Switching Center |
| PDA | Personal Digital Assistant |
| PDSN | Packet Data Serving Node/Home Agent |
| RAM | Random Access Memory |
| RTSP | Real-Time Streaming Protocol |
| RTP | Real-Time Transport Protocol |
| ROM | Read Only Memory |
| SIP | Session Initiation Protocol |
| TDMA | Time Division Multiple Access |
| URL | Uniform Resource Locator |
| WAN | Wide Area Network |
| 3GPP | $3^{rd}$ Generation Partnership Project |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to mobile devices. An illustrative operating environment 100 that contains a few of the components within such a communication network is shown in FIG. 1. The components shown in FIG. 1 are just some of the components that embodiments of the invention may interact with during operation. The components shown in FIG. 1 are described in brief, and with an emphasis on function for the sake of simplicity. The components within FIG. 1 are communicatively coupled to each other in a manner appropriate for carrying out their respective functions within the illustrative operating environment 100. Embodiments of the present invention are not limited by the communication protocols or formats used to facilitate communication between components; those mentioned are for the sake of enablement and not meant to be limiting.

Illustrative operating environment 100 includes mobile device 110, base station 120, gateway 130, proxy server 140, network 150, and content server 160. Illustrative operating environment 100 is merely an example of one suitable environment and is not intended to suggest any limitation as to the scope of use or functionality of the present invention. Neither should illustrative operating environment 100 be interpreted as having any dependency or requirement related to any single component or combination of components illustrated therein. For example, the present invention may be practiced in an environment that does not include a wireless network. An operating environment including a wireless access provider is included for the sake of illustration and not limitation.

Mobile device 110 is a wireless terminal that is adapted to receive communications and media over the wireless networks included in illustrative operating environment 100. Specifically, mobile device 110 may access content over the Internet. Some lower-level details of mobile device 110 are not shown so as to not obscure embodiments of the present invention. For example, mobile device 110 may include a bus that directly or indirectly couples the following devices: memory, one or more processors, one or more presentation components such as a display or speaker, input/output (I/O) ports, I/O components, and a power supply such as a battery. The display device is suitable for viewing media content such as movies, videos, video calls, or television shows. An LCD screen is one example of a display that might be used on the mobile device 110. Mobile device 110 may communicate via wireless protocols, such as code division multiple access ("CDMA"), global system for mobile communications ("GSM"), or time division multiple access ("TDMA"), as well as others, to communicate with base station 120.

Mobile device 110 may take on any of a variety of forms. By way of example, mobile device 110 may be a mobile telephone, smart phone, pager, computing device, personal digital assistant ("PDA") or any combination of these or other devices. Mobile device 110 has the ability to present one or more forms of media content. Examples of media content that could be displayed include, TV shows, movies, videos, MP3 files, and radio programs. This list is not exhaustive. The media may be presented as it is received from the wireless network or from memory within mobile device 110. Mobile device 110 may also be capable of receiving one or more forms of communication. Examples of communications that may be received include phone calls, video calls, text messages, multimedia messages, emails, calendar updates, and task reminders.

Base station 120 is a fixed station used for communicating with mobile device 110. Standard air interface protocols, such as code division multiple access ("CDMA"), global system for mobile communications ("GSM"), or time division multiple access ("TDMA"), as well as others, may be used by base station 120 to communicate with mobile device 110. Other network communication interface arrangements are also possible. A base station controller (not shown) is responsible for handling traffic and signaling with mobile device 110. Only one base station 120 is shown, and without its many components, for the sake of clarity. Mobile device 110 could be in simultaneous communication with multiple base stations.

Access gateway 130 provides a boundary between radio communication functions embodied in one or more radio access systems that form the access-facing portion of illustrative operating environment 100 and the standard internet protocol ("IP") communication functions (including Mobile IP) embodied in the public-network facing portion (e.g., network 150) of illustrative operating environment 100. Access gateway 130 might be, for example, an ASN-GW, a PDSN, a SGSN/GGSN, and the like.

Proxy server 140 is a combination of hardware and software. The hardware aspect is a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, software on proxy server 140 receives requests from mobile devices connected to the radio access network associated with the proxy server 140. The proxy server 140 may modify the request to include authentication information and forward the request to a content server, such as content server 160. In one embodiment, the request is an HTTP request. The proxy server 140 may modify the HTTP request by adding authentication information to the HTTP request header.

Network 150 is a wide area network ("WAN") and may include one or more mobile networks, one or more packet based networks, including the Internet, and the public switched telephone network ("PSTN"). The various components within network 150 may be owned and/or operated by multiple entities, commercial or otherwise. Network 150 is configured to transmit a variety of communication formats including phone calls, emails, text messaging, faxes, instant messaging, pages, voice mails, photographs, audio files, movies, TV shows, calendar reminders, task reminders and other files containing communicative content.

Content server 160 is a combination of hardware and software. The hardware aspect is a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, software on content server 160 facilitates transmission of media content (e.g. movies, videos, MP3's, etc.) to mobile device 110. The content server 160 transmits the media content over the packet switched network 150. The content server 160 may also host web pages that are transmitted to a requesting user. Content server 160 may be affiliated with the entity providing the mobile communication service to mobile device 110. A media server is affiliated with an entity if it is owned or operated by the entity, or by a third party that has an agreement with the entity.

Content server 160 may provide an access and authentication function in response to requests to access content on the content server 160. In one embodiment, access to the content is denied if the request does not contain information indicating the response came from the proxy server 140 operated by the entity providing service to the mobile device 110. This practice allows the proxy server 140 to provide an initial authentication function for the mobile device 110. This practice may be used when the content provider associated with the content server 160 has an agreement to provide content to users of the communications network provided by an access provider. The content server 160 may work in conjunction with other components, such as a content provider proxy server (not shown).

Figure 2:
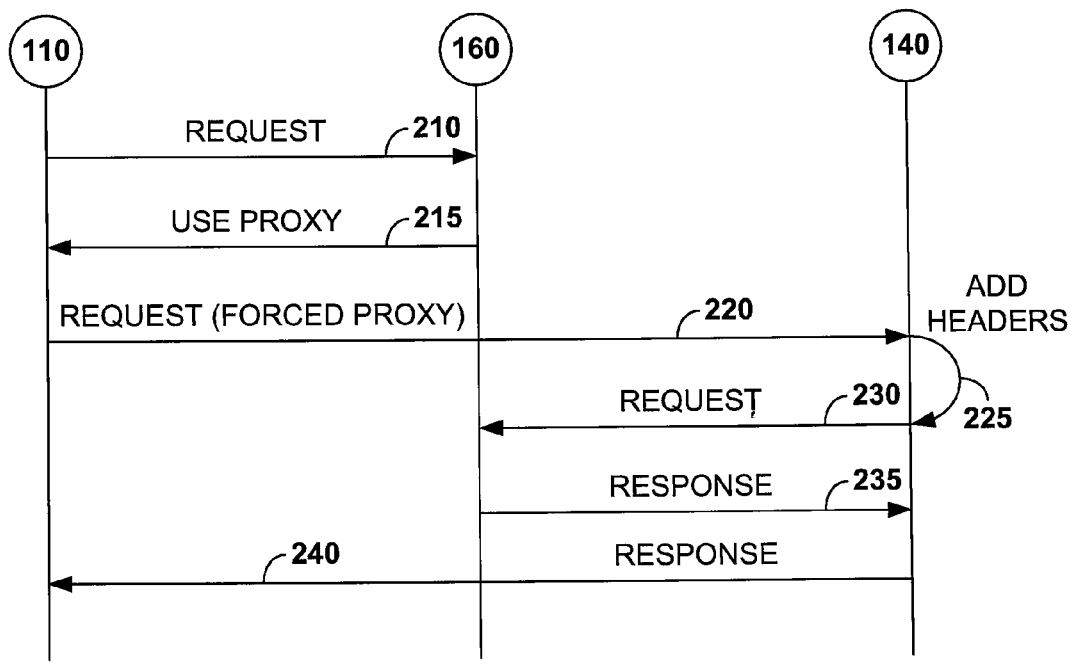
FIG. 2 is a drawing illustrating communications occurring between a mobile device, proxy, and a content provider, according to an embodiment of the present invention.

Turning now to FIG. 2, a chart showing communications occurring between mobile device 110, content server 160, and proxy server 140 is shown in accordance with embodiments of the present invention. The mobile device 110, content server 160, and proxy server 140 have been described previously with reference to FIG. 1.

Initially, a request 210 is sent from mobile device 110 to content server 160 without going through proxy server 140. As explained previously, multiple network components may facilitate the transfer of the request 210 from mobile device 110 to content server 160. For the sake of simplicity, these network components are not shown in FIG. 2. The request may be generated by a client application (e.g., web browser, media player) operating on the mobile device. Throughout this description the request will be described as coming from the mobile device without reference to the application that may have generated the request.

As described previously, content server 160 may rely on proxy server 140 to provide an authentication function for content server 160. For example, content server 160 may require that a request is identified as coming from proxy server 140 and/or includes identification information added by proxy server 140. In one embodiment, the identification information added by proxy server 140 is used for the purpose of billing the user of mobile device 110 for the requested content.

In response to request 210, the content server 160 sends a response 215 indicating to mobile device 110 that the content should be accessed through proxy server 140. In one embodiment, the response 215 is in the form of an HTTP 200 response message. The HTTP 200 response message is not a rejection per se but acknowledges the request was received and provides additional information to the requester. Specifically, the additional information identifies the proxy server through which a request for content on content server 160 should be made. When using the HTTP 200 response to indicate a proxy server through which the request should be sent, the proxy server information may be included in a designated header. Other message types, including other HTTP message types, could be used to provide this information to the mobile device 110. In effect, response 215 indicates to the mobile device 110 that the request 210 has not necessarily been rejected or redirected, just that an additional step needs to be taken before a final access determination can be made.

Having received the response 215, mobile device 110 sends a forced proxy request 220 to proxy server 140. The forced proxy request 220 indicates that the content server 160 required that a request for content come through proxy server 140. The forced proxy request 220 may include information regarding the requested content.

In response to receiving the forced proxy request 220, the proxy server 140 authenticates the mobile device 110 and, if satisfied, adds header information to the forced proxy request 220 and generates request 230, which is sent to the content server 160. The content server 160 will then evaluate request 230 to determine if access should be granted based on the information contained in request 230, including the information added by proxy server 140. If access is granted, a response 235 is sent to the proxy server, which is then forwarded to mobile device 110 as response 240. Similarly, if access was not granted by content server 160, then the response 235 and response 240 would indicate that access was not granted. Thus, the communications between the mobile device 110, content server 160, and proxy server 140 provide a method for the content server 160 to instruct the mobile device 110 to resend a request through proxy server 140 so that access may be properly evaluated for and granted if appropriate.

Figure 3:
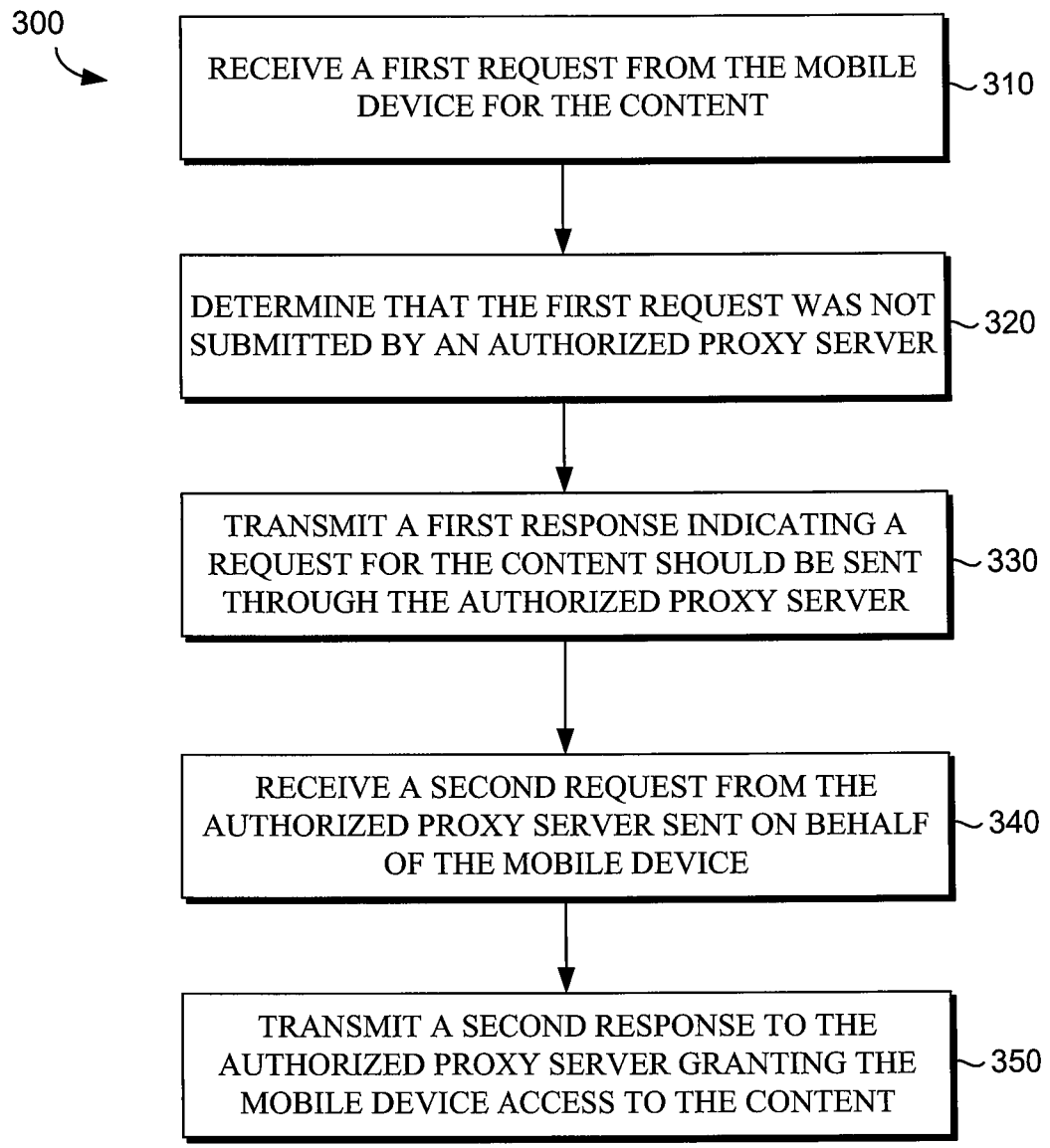
FIG. 3 is a flow diagram in which a method of instructing a mobile device to request access to content by submitting a new request to a proxy server is described, according to an embodiment of the present invention.

Turning now to FIG. 3, a method of instructing a mobile device to request access to content by submitting a new request to a proxy server is shown, in accordance with an embodiment of the present invention. The method may be performed by any device performing an online access and authentication procedure, such as content server 160 described previously. At step 310, a first request for the content is received from a mobile device. The first request is not sent through the proxy server that provides information required for a request to be granted by the content provider. At step 320, the first request is determined not to have been submitted by an authorized proxy server. This determination may be made by evaluating information in the request header.

At step 330, a first response indicating that a request for the content should be sent through the authorized proxy server is transmitted. In one embodiment, the first response is transmitted to the requesting device. As explained previously, the response may take the form of an HTTP response. Specifically, the response may be an HTTP 200 message response. Other types of message responses are also contemplated to be within the scope of embodiments of the present invention. The response should indicate that a valid request for the content needs to come from the authorized proxy server. Information about the authorized proxy server may be contained within a response header. The information in the header may include an address of the authorized proxy server.

At step 340, a second request is received from the authorized proxy server sent on behalf of the requesting mobile device. The requesting mobile device is the same mobile device that sent the first request. The second request may contain additional information added by the authorized proxy server, including identification information for a user. The additional information may also include an indication that the second request is sent from the authorized proxy server. At step 350, a second response is transmitted to the authorized proxy server granting the requesting mobile device access to the content. The second response may then be forwarded to the requesting mobile device by the authorized proxy server. Messages may then continue to be sent back and forth between the requesting mobile device, authorized proxy server, and a content provider to set up a communication session and download the requested content to the requesting device running the mobile device. In one embodiment, the second request contains header information indicating that the second request is a forced proxy request. In other words, the header information indicates that the requesting mobile device was forced to use the authorized proxy server to send the request.

Figure 4:
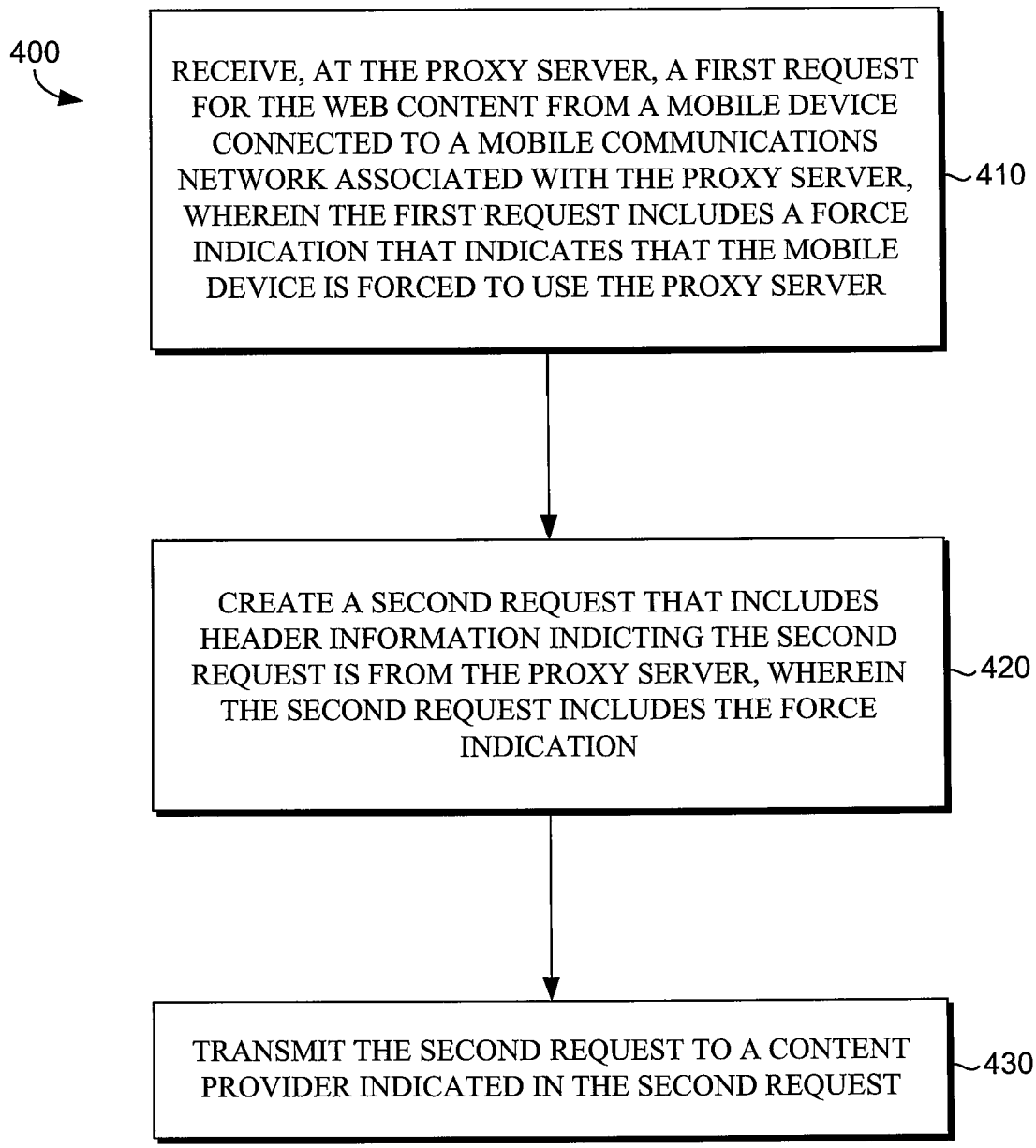
FIG. 4 is a flow diagram in which a method authenticating access to web content using a proxy server is described, according to an embodiment of the present invention.

Turning now to FIG. 4, a method of authenticating access to web content using a proxy server is described, in accordance with an embodiment of the present invention. Method 400 may be performed by a proxy server, or other device, that provides authentication information to a content provider on behalf of a requesting device. At step 410, the proxy server receives a first request for the web content from a mobile device connected to a mobile communications network associated with the proxy server. The first request includes a force indication that indicates that the mobile device, which generated the first request, is forced to use the proxy server to access the content. As explained previously, the requesting mobile device may have previously received a message from the content provider with instructions to request the content using the proxy server.

At step 420, a second request is created that includes header information indicating the second request is from the proxy server. The second request may also include the force indication. As described, the force indication lets downstream recipients know that the request is sent through the proxy server as a result of the original requester receiving an indication that the request for content should come through the proxy server. At step 430, the second request is transmitted to a content provider indicated in the second request. The proxy server may receive a confirmation message from the content provider in response to the second request. The confirmation message indicates that the request satisfies the authentication criteria. The proxy server may then transmit this response to the requesting mobile device. In one embodiment, the entity providing the mobile communications network is associated with a content provider and the proxy server.

Figure 5:
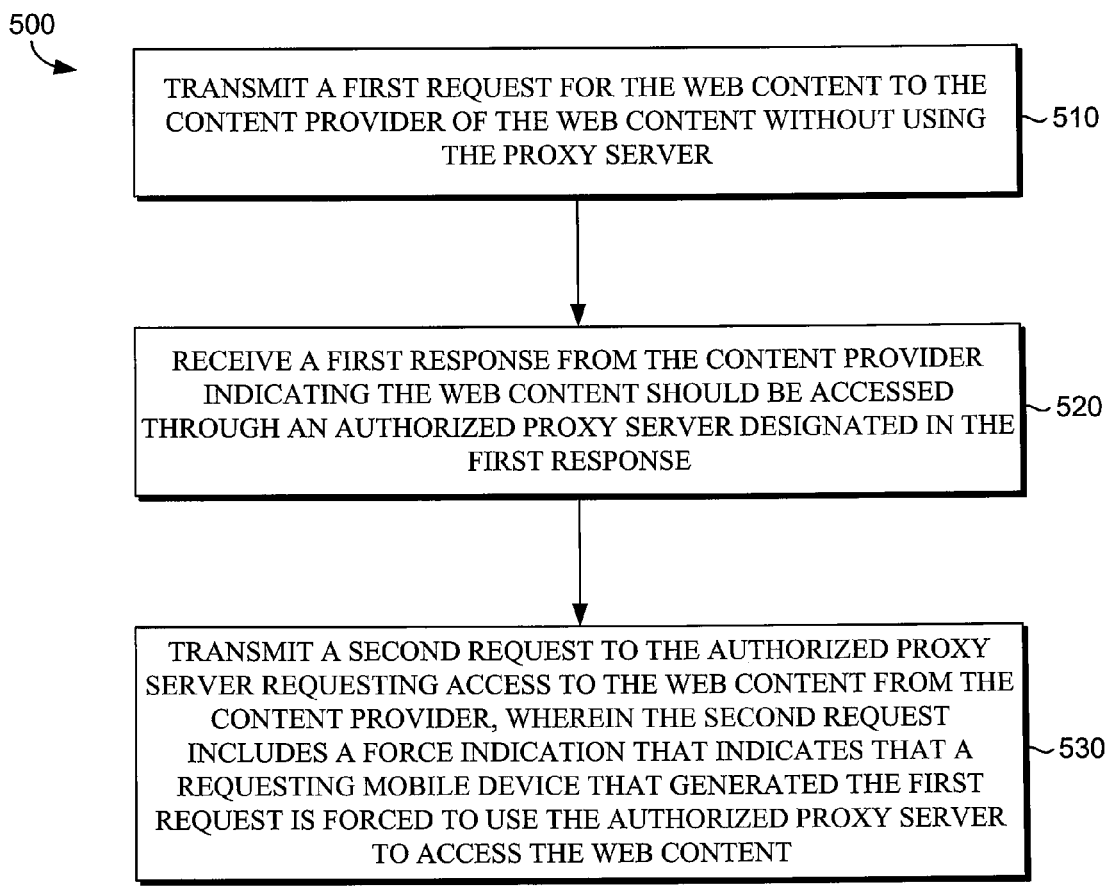
FIG. 5 is a flow diagram in which a method authenticating access to web content using a proxy server is described, according to an embodiment of the present invention.

Turning now to FIG. 5, a method of requesting access to web content using a proxy server is described in accordance with an embodiment of the present invention. Method 500 may be performed by a communications device requesting content from a content provider. At step 510, a first request for the web content is transmitted to a provider of the web content without using the proxy server. At step 520, a first response from the content provider indicating the web content should be accessed through an authorized proxy server is received. Thus, the first response indicates a proxy server through which a request should be sent. The address of the proxy server may be provided in the first response. At step 530, a second request is transmitted to the authorized proxy server requesting access to the web content. The second request includes a force indication that indicates that a requesting mobile device that generated the first request is forced to use the authorized proxy server to access the web content. As described previously, the second request may be modified by the proxy server to include identification information and then forwarded to the content provider.

Many different arrangements of the various components depicted, as well as components not shown, are possible without departing from the spirit and scope of the present invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon for performing a method of instructing a mobile device to request access to web content by submitting a new request to a proxy server, the method comprising:
    receiving a first request from the mobile device for the web content;
    determining that the first request was not submitted by an authorized proxy server;
    transmitting a first response indicating a request for the web content should be sent through the authorized proxy server;
    receiving a second request from the authorized proxy server sent on behalf of the mobile device, wherein the second request's header information includes a force indication that is provided by the authorized proxy server, and wherein the authorized proxy server is designated in the first response; and
    transmitting a second response to the authorized proxy server granting the mobile device access to the web content.

2. The media of claim 1, wherein the first request is an HTTP message.

3. The media of claim 1, wherein the first request is determined to not be submitted by the authorized proxy server because the first request lacks header information added by the authorized proxy server.

4. The media of claim 1, wherein the first response instructs the mobile device to access the content using the authorized proxy server through a parameter in the first response that includes an address of the authorized proxy server.

5. The media of claim 1, wherein the first response is an HTTP 200 message.

6. One or more non-transitory computer-storage media having computer-executable instructions embodied thereon for performing a method of authenticating access to web content using a proxy server, the method comprising:
    receiving, at the proxy server, a first request for the web content from a mobile device connected to a mobile communications network associated with the proxy server, wherein the first request's header information includes a force indication that indicates that the mobile device is forced to use the proxy server, which is designated by a content server as an authorized proxy server;
    creating a second request that includes header information indicting the second request is from the proxy server, wherein the second request includes the force indication;

transmitting the second request to the content server indicated in the second request; and receiving, at the proxy server, a response from the content server granting the mobile device access to the web content.

7. The media of claim 6, wherein the first request and the second request are HTTP messages.

8. The media of claim 6, wherein the first request is generated by a mobile web browser running on the mobile device.

9. The media of claim 6, further comprising, subsequent to receiving the response:

transmitting the response to the requesting mobile device.

10. The media of claim 6, wherein the content provider is associated with an entity providing the mobile communications network.

11. The media of claim 6, wherein the force indication is provided by modifying a header in an HTTP request.

12. One or more non-transitory computer-storage media having computer-executable instructions embodied thereon for performing a method of requesting access to web content using a proxy server, the method comprising:

transmitting a first request for the web content to the content provider of the web content without using the proxy server;

receiving a first response from the content provider indicating the web content should be accessed through an authorized proxy server designated in the first response;

transmitting a second request to the authorized proxy server requesting access to the web content from the content provider, wherein the second request's header information includes a force indication that indicates that a requesting mobile device that generated the first request is forced to use the authorized proxy server to access the web content; and receiving a second response from the content server indicating the second request is acceptable.

13. The media of claim 12, wherein the first request and the second request are HTTP messages.

14. The media of claim 12, wherein the first request is generated by a mobile web browser running on the requesting mobile device.

15. The media of claim 12, wherein the first request lacks header information added by the authorized proxy server that is required for access to the web content.

16. The media of claim 12, wherein the first response instructs a mobile device to access the web content using the authorized proxy server through a parameter in the first response that includes an address of the authorized proxy server.

17. The media of claim 12, wherein the method further includes receiving the web content from the content provider.

\* \* \* \* \*